(12) United States Patent
Xu (10) Patent No.: US 8,468,144 B2
(45) Date of Patent: Jun. 18, 2013

(54) METHODS AND APPARATUS FOR ANALYZING INFORMATION TO IDENTIFY ENTITIES OF SIGNIFICANCE

(75) Inventor: Brian H. Xu, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 91 days.

(21) Appl. No.: 13/041,072

(22) Filed: Mar. 4, 2011

(65) Prior Publication Data

US 2011/0231382 A1    Sep. 22, 2011

Related U.S. Application Data

(60) Provisional application No. 61/315,640, filed on Mar. 19, 2010.

(51) Int. Cl.
*G06F 17/00* (2006.01)

(52) U.S. Cl.
USPC ............................. 707/706; 707/723; 707/769

(58) Field of Classification Search
USPC .................................................. 707/723, 769
See application file for complete search history.

(56) References Cited

U.S. PATENT DOCUMENTS

| | | | |
|---|---|---|---|
| 7,689,433 | B2 | 3/2010 | Chuah et al. |
| 2006/0149565 | A1 | 7/2006 | Riley |
| 2006/0245641 | A1 | 11/2006 | Viola et al. |
| 2008/0059442 | A1* | 3/2008 | Guo et al. ........................ 707/4 |

FOREIGN PATENT DOCUMENTS

| | | |
|---|---|---|
| EP | 1482415 A2 | 12/2004 |
| EP | 1482415 A3 | 7/2006 |
| EP | 1843256 A1 | 10/2007 |

OTHER PUBLICATIONS

EP Search Report, EP 11157232.7-2201 dated Jul. 21, 2011.
EP Communication, EP 11157232.7-2201 dated Aug. 26, 2011.
Strandburg, K. J.; Surveillance of Emergent Associations: Freedom of Association in a Network Society, KJ Strandburg 2007.
Schroeder, J. et al.; Automated Criminal Link Analysis Based on Domain Knowledge; Wiley InterScience, Feb. 21, 2007.
Wang, Y. et al.; Link Based Clustering of Web Search Results, Institute of Industrial Science, The University of Tokyo, 2002.
Gloor, P.A.; Identifying Potential Suspects by Temporal Link Analysis, University of Cologne, 2006.

* cited by examiner

*Primary Examiner* — Belix M Ortiz Ditren
(74) *Attorney, Agent, or Firm* — Ingrassia Fisher & Lorenz, P.C.

(57) ABSTRACT

Embodiments include methods for analyzing information performed by a data analysis system. The method includes parsing data from one or more data sources, resulting in parsed data, forming a plurality of chains of terms from the parsed data, and determining a significance score for an entity identified in one or more of the chains based, at least in part, on one or more positions of the entity within the one or more chains. Embodiments of the method may be used to identify entities of significance (e.g., in a group, organization or social network).

16 Claims, 7 Drawing Sheets

```
chain={ keywords={ Notown MGRSCOORD },
        from=Sat Aug 12 00:00:00 PDT 2006
        to=Sat Aug 12 00:00:00 PDT 2006
        entities={ by Notown police Joe Smith } }
chain={ keywords={ church Abia
                   MGRSCOORD Adam },
        from=Mon Jan 01 00:00:00 PST 2007
        to=Mon Jan 01 00:00:00 PST 2007
        entities={ residents of Notown
                   Sam Thompson. [aliases:7973644601,photo of Sam Thompson.] } }
```

FIG. 4

```
group={ entities={ a large shipment of seeds three Phoenicians }
        chain={ keywords={ Glendale MGRSCOORD },
                from=Fri May 04 00:08:00 PDT 2007
                to=Fri May 04 00:08:00 PDT 2007
                entities={ a large shipment of seeds three Phoenicians } } }
group={ entities={ backpack sprayer American }
        chain={ keywords={ soldier Camp from=Fri May 04 00:08:00 PDT 2007
                to=Fri May 04 00:08:00 PDT 2007
                entities={ American backpack sprayer } } }
```

METHODS AND APPARATUS FOR ANALYZING INFORMATION TO IDENTIFY ENTITIES OF SIGNIFICANCE

RELATED APPLICATION

This application claims priority to provisional U.S. Patent Application Ser. No. 61/315,640, filed on Mar. 19, 2010.

TECHNICAL FIELD

Embodiments of the subject matter described herein relate generally to methods and apparatus for analyzing data and information, and more particularly to methods and apparatus for associating and analyzing data and information to identify and quantify the significance of entities.

BACKGROUND

Technologies currently exist for transforming data and information into knowledge to be utilized in obtaining an understanding of a current situation. However, current technologies are facing huge challenges, including an overload of data and information. For example, current technologies struggle to parse and interpret data sources across diverse platforms and networks, particularly when significant amounts of data are unstructured (e.g., reports, articles, news feeds, Web pages, emails, and so on). Accordingly, improved knowledge discovery technologies are needed, which may more readily transform vast amounts of structured and/or unstructured data and information into knowledge to be utilized in obtaining an understanding of a current situation.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Embodiments include methods and apparatus for analyzing structured and/or unstructured data and/or information in order to discover, identify, and track entities of significance. As used herein, "structured data" refers to data that fits in the context of a data model, data stored in fielded form (e.g., in a relational database), data that is annotated (e.g., semantically tagged) in documents, and/or data stored within a relational database. In contrast, "unstructured data" refers to data that either does not have a pre-defined data model and/or that does not fit well into relational tables. Unstructured data includes, for example but not by way of limitation, human intelligence data, communications intelligence data, image intelligence data, reports, articles, text messages, web-based feeds (e.g., Really Simple Syndication (RSS) formatted feeds), blogs, web pages, books, journals, documents, metadata, audio transcripts, video, files, body sections of an email-message or word processor document, conversation transcripts, and telephone call transcripts. It is to be understood that some "unstructured" data may actually have structure, although the structure may not be known in advance by the system (e.g., system 100, FIG. 1), and therefore the data is not structured from the point of view of the system.

As used herein, the term "entity" means an individual (e.g., a person identifiable by a name, nationality, characteristic (e.g., gender, age, appearance), association (e.g., with a group, organization, social network or other formally organized or informally organized group), occupation, and so on), a business entity, a group, an organization, a location (e.g., country, city, address, geographical location), a tangible or intangible subject, an object, an action (e.g., verb), an event, a date and/or date range, a time and/or time range, a concept, and/or a keyword, which may be identified from structured and/or unstructured data in a data block. For purposes of convenience and conciseness, individuals are identified by initials, herein (e.g., "T. A" may refer to "Tom Arnold," "Z. O" may refer to "Zachary O'Steen", and so on). The term "entity of significance" means an entity that is determined by a data analysis system (e.g., system 100, FIG. 1) to be of particular importance, interest or significance (e.g., based on significance indicators and/or scores and/or connection weights, as described later).

Particular embodiments include methods and apparatus for performing link analysis and associative search processes in order to discover and identify entities of significance referred to as "high value individuals" (HVIs). HVIs include, for example, individuals that may be affiliated with a group, organization or social network (referred to herein collectively as a "group"), although an HVI may be unaffiliated with any particular group, as well. As used herein, a "group" refers to a plurality of individuals that are either specifically identified as being associated with a formally or informally organized entity (e.g., based on a known list of employees, members or subscribers), individuals having a particular characteristic (e.g., a particular nationality, gender, or age), individuals in a familial relationship, individuals with a particular type of occupation or expertise, individuals who perform a particular action, and so on. Integrated link analyzers and associative search engines (e.g., link analyzer 120 and search engine 110, FIG. 1) of the various embodiments may effectively discover, identify, and track HVIs by accessing and analyzing potentially massive quantities of information from disparate data sources.

The various embodiments may be integrated with a reasoning rule engine (e.g., a software tool configured to infer logical consequences from a set of asserted facts or axioms. Such rule engines use first-order predicate logic to perform reasoning. Inference commonly proceeds by forward chaining and backward chaining), a blackboard system (e.g., an artificial intelligence application based on a blackboard architectural model), and/or an intelligent agent (e.g., an autonomous entity that observes and acts upon an environment) for effectively identifying and tracking HVIs. Embodiments of integrated link analyzers and associative search engines identify HVIs by automatically searching, analyzing, and quantifying data (e.g., structured and/or unstructured data). As will be explained in more detail below, the analysis and quantifying tasks include determining "significance scores" attributed to entities, and the identification task includes evaluating the significance scores to determine which scores indicate entities of relatively-high significance (e.g., HVIs), in an embodiment.

Figure 1:
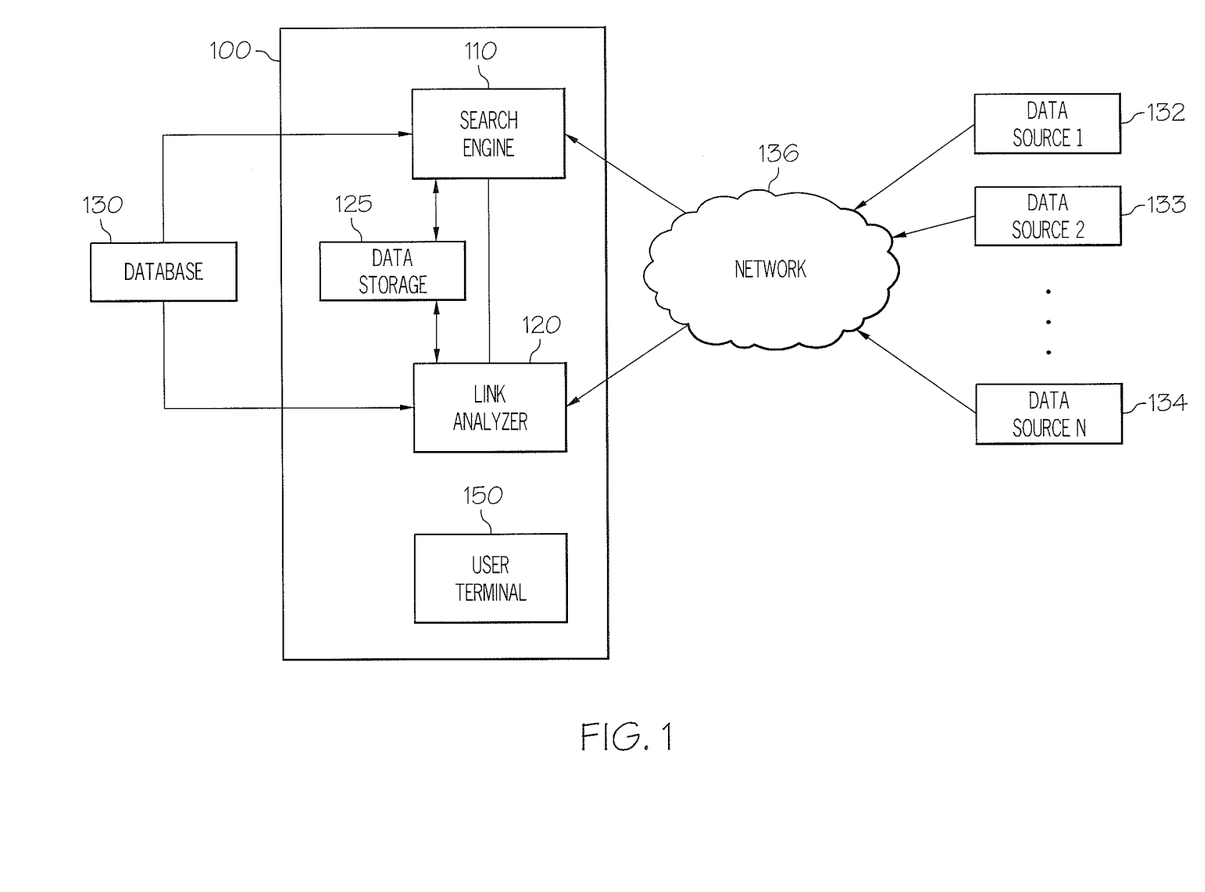
FIG. 1 is a simplified block diagram of an information analysis system, in accordance with an example embodiment.

FIG. 1 is a simplified block diagram of an information analysis system 100, in accordance with an example embodiment. System 100 includes one or more user terminals 150 and a processing portion having one or more associative search engines 110, one or more link analyzers 120, and data storage 125. Associative search engine 110, link analyzer 120, and user terminal 150 may be implemented as distinct processing systems or combined processing systems that implement functions of each of these system components.

Figure 2:
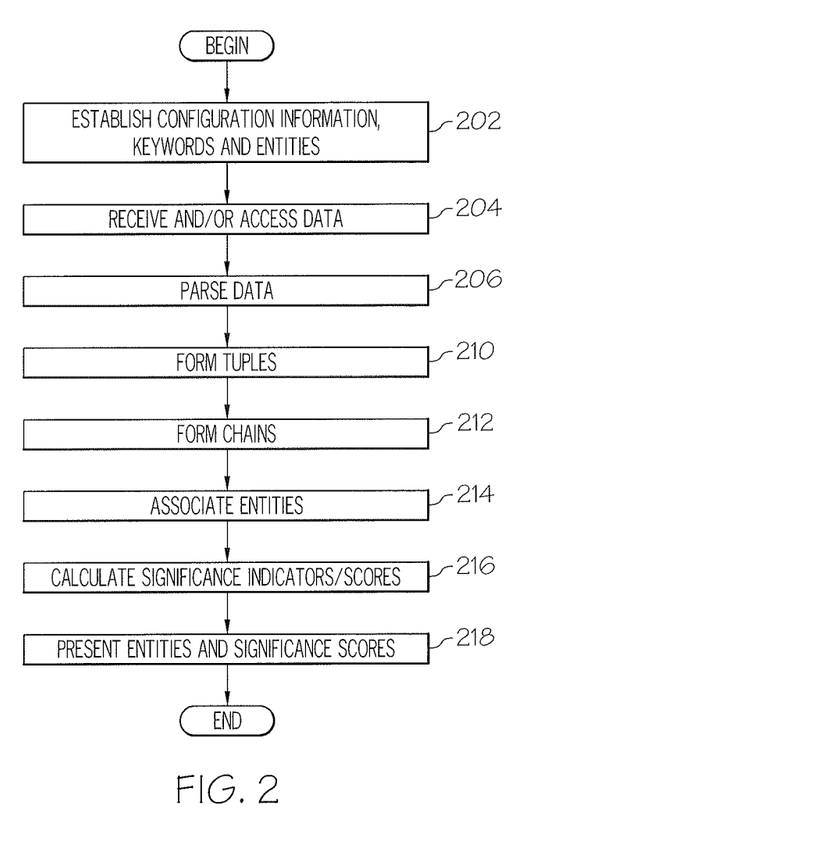
FIG. 2 is a flow chart of a method for analyzing data to quantify and evaluate entity significance, in accordance with an example embodiment.

FIG. 1 should be viewed in conjunction with FIG. 2, which is a flow chart of a method for analyzing data to quantify and evaluate entities of significance, in accordance with an example embodiment. Various steps of the method may be performed, for example, by user terminal 150, associative search engine 110, and/or link analyzer 120. Although the description below may refer to one or the other of user terminal 150, associative search engine 110 or link analyzer 120 performing a particular process, it is to be understood that a particular process may be performed by other system components (or system components not specifically illustrated or described herein). Accordingly, any description that specifies performance of a process by a particular system component is not meant to be limiting, but instead is meant to provide an example of a particular embodiment.

Referring first to FIG. 1, user terminal 150 includes a user interface (e.g., keyboard, cursor control device, and so on), a display system, and a processing system that enables user terminal 150 to communicate with the processing portion of system 100. As will be described in more detail below, a user (e.g., an analyst) may interact with system 100 via a user terminal 150, where the interaction may include establishing various configuration information regarding searching and processing data, and presenting information to the user that conveys the search and processing results.

Referring now also to FIG. 2, in process 202, an embodiment of a method for analyzing data may begin by enabling a user to establish configuration information, keywords, and/or entities of interest, each of which may affect subsequent searching, parsing, and analysis tasks performed by system 100. As will be described in more detail below, the configuration information, keywords, and entities of interest may affect the parsing and analysis of the data. For example, functions performed by associative search engine 110 and link analyzer 120 may be constrained or otherwise influenced by the configuration information, keywords, and entities of interest. As will be explained in more detail later, system 100 is configured to enable a user to establish and/or edit the configuration information, keywords, and entities of interest (e.g., via user terminal 150) based on a particular mission or task (e.g., tasks such as organization/group recruiting or a particular type of activity).

In a particular embodiment, data associated with individuals within a particular group may be analyzed to identify HVIs within the group, organization or social network. For example, search constraining configuration information may be provided to limit analyzed data only to data associated with the particular group (e.g., text-based posts associated with a particular social networking site, emails originating from or destined for email addresses associated with a particular group, telephone call transcripts from individuals within the group, and so on). Alternatively, a user may constrain a search by providing keywords that constrain the search to focus on information associated with a particular group. For example, but not by way of limitation, a user may specify keywords that include the name of the group, and/or that specify the names of individuals in the group.

The configuration information for a particular analysis may be included, for example, in one or more configuration files (e.g., the example configuration files in FIGS. 4-7). As will be described in more detail below, configuration information may include "search constraining" configuration information, "tuple-defining" configuration information, "chain-defining" configuration information, "group-defining" configuration information, "score-calculation" configuration information, and so on, each of which may be input into one or more configuration files. Although not described in detail below, other configuration parameters may be specified regarding the volume, sources, and/or types of data to be analyzed, data quality and/or reliability, clutter factors, physical environment, and/or the urgency of a current situation, for example. The format and content of the various configuration files illustrated (e.g., in FIGS. 4-7) and described herein are examples only, and are referred to below for enhanced understanding of the inventive subject matter. These examples are not intended to be limiting. One of skill in the art would understand that the formats of the configuration files, the particular configurable parameters included in any particular file, and the various configuration values may be different from the examples provided in FIGS. 4-7.

"Search constraining" configuration information may specify, for example, a number of minimum and/or maximum keywords that a user must specify when initiating a search and analysis. For example, these quantities may be embodied in a "minimum-keyword-length" parameter and a "maximum-keyword-length" parameter, respectively. According to an embodiment, the "minimum-keyword-length" parameter indicates a minimal number of concept keywords (e.g., 3 in FIG. 6 and 6 in FIG. 7), and the "maximum-keyword-length" parameter indicates a maximal number of concept keywords (e.g., 8 in FIG. 6 and 11 in FIG. 7). The value of these parameters may be selected based on the complexity of the file content and the search speed.

Figure 3:
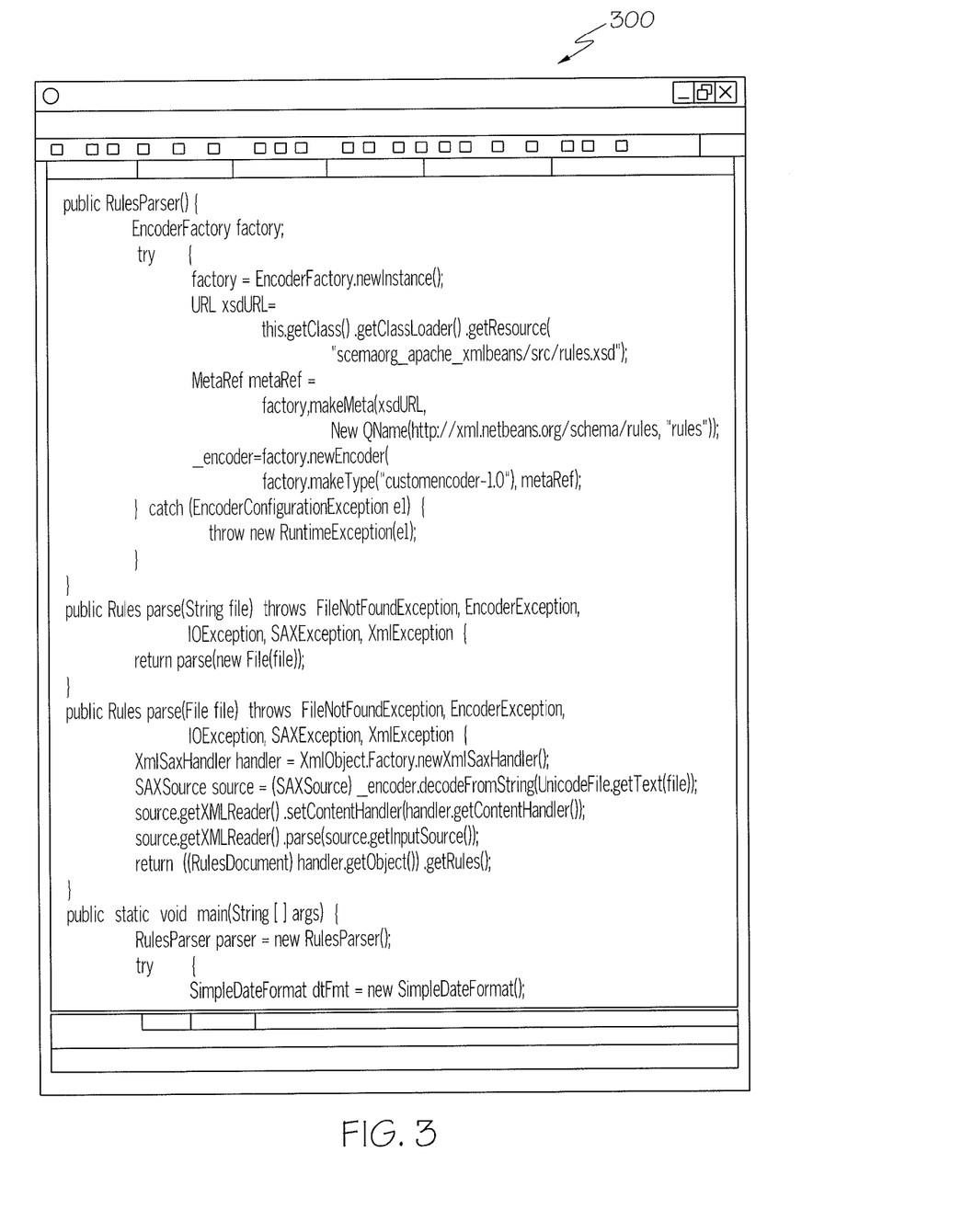
FIG. 3 illustrates an exemplary Java-implemented source code listing corresponding to an associative search engine, in accordance with an example embodiment.

In process 204, associative search engine 110 receives and/or accesses data for analysis directly (e.g., from one or more databases 130 and/or data storage 125) and/or indirectly from one or more remote data sources 132, 133, 134 (e.g., from remote data sources 132-134 via one or more networks 136). Associative search engine 110 may, for example, be implemented in software (e.g., using the Java programming language or another programming language) for a variety of computer platforms. For example, FIG. 3 illustrates an exemplary Java-implemented, partial source code listing 300 corresponding to an associative search engine with data parsing capability, in accordance with an example embodiment. Those of skill in the art would understand that the various processes performed by associative search engine 110 may be implemented using different source code and/or a different software language, as well.

As an example, associative search engine 110 may operate as a software service running intermittently or continuously on a data repository server. The data analyzed by associative search engine 110 may be structured or unstructured, and may be received in the form of files, information streams, information bursts, raw data, communications (e.g., encrypted messages, encoded messages, plain-text messages), or in other formats. According to an embodiment, the data content may include, but is not limited to human intelligence data, communications intelligence data, image intelligence data, and other information regarding activities and patterns associated with an entity (e.g., an HVI).

The received and analyzed data may be represented in the form of various types of "data blocks." As used herein, the term "data block" refers to a distinctly definable data object or entity, which may include any type of computer-readable information, including text files, computer-readable communications (e.g., digital transcriptions from telephone or other voice communications, email messages, blog entries, social network posts, text messages (e.g., Short Message Service (SMS) messages), documents, files, and so on), reports, image data, video data, voice and/or sound data (e.g., digital transcriptions of audible sounds), websites (e.g., personal websites, news websites, social networking sites, and so on), streaming media, and control information, among other things. A particular data block may be considered a record of an event. For example, data within a data block may serve as a record of an event such as the transmission of an email, the making of a phone call, the making of a social network post, the transmission of a text message, and so on. According to a particular embodiment, associative search engine 110 is configured to analyze the content of various types of data blocks that are encoded according to ASCII (American Standard Code for Information Interchange), Unicode, or other character encoding standards and techniques. Associative search engine 110 also may be configured to analyze data formatted according to various audio, image, and/or video formatting standards, as well.

In an embodiment, associative search engine 110 is configured to parse the data blocks, in process 206, and to detect sets of conceptual terms or keywords (e.g., as provided by the user in process 202) within the data blocks. Associative search engine 110 parses data within received and/or otherwise accessed data blocks into search concepts and entities. A "search concept" may be defined by a set of keywords (e.g., keywords specified by the user via user terminal 150) that will be searched for in the received data. For example, if the user were to desire a search to be performed relating to certain materials being purchased by a particular individual, a search concept may be defined by keywords that identify the materials and actions relating to purchasing the materials. Associative search engine 110 is capable of searching, exploiting, and identifying data that are related to the specified search concepts and entities, including non-structured data (e.g., emails, text messages, and so on) and structured data (e.g., data within a relational database management system (RDBMS), resource description framework (RDF), and so on) in ASCII, Unicode, or other formats. According to an embodiment, once a search is initiated, associative search engine 110 may continuously search various data sources, parse data and/or data blocks within those sources, and identify entities of interest (e.g., HVIs). Parsing of received data (e.g., data blocks) from one or more data sources may include identifying data and/or data blocks that include one or more of the keywords defining a search concept and any entities that may be specified. Parsing enables relevant data and/or data blocks within vast quantities of data to be identified for further analysis, thus reducing the sheer quantity of data being analyzed. In other words, parsing enables irrelevant data to be discounted and ignored in subsequent data processing tasks performed by the associative search engine 110 and link analyzer 120.

In addition to parsing data, associative search engine 110 may be configured to determine statistics for the keywords. For example, associative search engine 110 may receive data blocks in the form of an ASCII encoded email and an ASCII encoded document file (e.g., a file produced by a word processor). Associative search engine 110 may then analyze the content of the email and document file, and generate a list of terms or keywords included in the email and file, along with statistics regarding those keywords. For example, but not by way of limitation, "statistics" for a group of keywords may include one or more statistics selected from a group consisting of a keyword's frequency (e.g., how many times the keyword appears in a data block or file), position (e.g., where the keyword appears in the data block or file, such as a given number of words from the beginning, or a more vague description such as "beginning", "middle," or "end"), and distances (e.g., distances (e.g., number of words) between the keyword and a previous instance of the keyword or another keyword). In an embodiment, once the statistics are determined, the keywords associated with those statistics may be ranked. For example, once a frequency has been determined for each of a set of keywords, the keywords may be ranked based on their frequency (e.g., a first keyword appearing 100 times in a data block may be ranked higher than a second keyword appearing 5 times within the data block). A particular embodiment uses a 2-byte indexing technique, which may enable system 100 to process data at about 50 megabytes per second (MB/s).

According to an embodiment, associative search engine 110 identifies entities from the structured and/or non-structured data within the received, parsed or otherwise accessed data blocks, and forms "tuples" from the identified entities, in process 210. These tuples may be stored in data storage 125, for example. As used herein, a "tuple" is a sequentially organized set of terms having multiple dimensions (e.g., subject, verb, object, time, and so on). "Sequentially organized," as used herein, means organized in a pre-defined manner. In the case of a tuple, sequential organization means that the terms are organized into pre-defined fields of the tuple, where each field corresponds to a type of term (e.g., subject, verb, object, time, and so on). A "tuple" may be more specifically defined as a pre-defined and populated data structure that includes a plurality of entity fields, where each entity field corresponds to a type of entity. For example, various "types" of entities that may be represented in a tuple may include, but are not limited to, an individual, a business entity, a group, an organization, a location, a tangible or intangible subject and/or object, an action (e.g., verb), an event, a date and/or date range, a time and/or time range, a concept, and/or a keyword, among other things. The associative search engine 110 may evaluate one or more received data blocks, and when the associative search engine 110 encounters entities of the types that correspond to entities associated with a particular type of tuple, the associative search engine 110 may initiate, populate, and store a tuple, according to an embodiment. A particular tuple may be formed from data contained within a single data block or multiple data blocks, in various embodiments. In addition, one or a plurality of tuples may be formed from a single data block.

The manner in which tuples are constructed may be defined based on "tuple-defining" configuration information specified by a user (e.g., in process 202), in an embodiment. Tuple-defining configuration information may specify, for example, the various fields of particular types of tuples (e.g., the format of a type of tuple). The number of fields (e.g., entity types) represented in a particular tuple format may be in a range of one to ten or more, in an embodiment. For purpose of example only and not of limitation, one type of tuple may be configured to include the following entity fields in the following order: subject, verb, direct object, time, date, location, and miscellaneous information. In other embodiments, a tuple may have more, fewer, different, and/or differently arranged fields. When associative search engine 110 determines that one or more parsed data blocks includes some or all of the types of entities specified in tuple-defining configuration information, associative search engine 110 may create a tuple, and the fields of the tuple may be populated with entities that are extracted from the analyzed data (e.g., the parsed data blocks). For example, an analyzed text file may include information indicating that T. A. purchased aluminum at 5:47 p.m. on Aug. 7, 2006 from ABC Industries in Spokane, Wash. In such a case, associative search engine 110 may identify the following entities from the file: T. A. (a namable person and a subject); purchase (a verb/action); aluminum (a noun and an object); 5:47 p.m. (a time); Aug. 7, 2006 (a date); ABC Industries (a location, a namable organization, a noun, and miscellaneous information); and Spokane, Wash. (a location). Through analysis of the file and in conformance with the configuration information that defines the tuple structure, search engine 110 may form a tuple having fields, according to the above example, such as: Tuple 1 {subject=T. A.; verb=purchase; direct object=aluminum; time=5:47 p.m.; date=Aug. 7, 2006; location=Spokane, Wash.; miscellaneous=ABC Industries}.

As another example, a different tuple structure may be configured to include a different set of ordered entity fields, such as: sender, time, date, and recipient. If associative search engine 110 were to analyze an email sent from T. A. to O. W. on Aug. 12, 2009 at 2:17 p.m., associative search engine 110 may form a tuple as follows: Tuple 2 {sender=T. A.; time=2:17 p.m.; date=Aug. 12, 2009; recipient=O. W.}. According to an embodiment, all fields of a tuple need not be populated in order for the tuple to be created and/or used in subsequent analysis. For example, if the above example email did not indicate a time that the email was sent, the time field of the tuple may be left unpopulated.

According to an embodiment, after formation of a plurality of tuples, link analyzer 120 forms "chains" by linking tuples and/or entities within tuples together, in process 212. As used herein, "linking" refers to establishing a relationship between two or more tuples and/or entities within two or more tuples. In other words, a "chain" is a sequentially organized set of tuples (e.g., two or more tuples), and thus a chain links together a plurality of entities (e.g., entities within tuples). Because a chain is a sequentially organized set of tuples, a chain also may be considered to be a sequentially organized set of terms. Information defining the chains may be stored in data storage 125, in an embodiment.

As will be described in more detail later, link analyzer 120 links tuples together in a "head-end" manner, in order to create chains (e.g., the "head" or first field of one tuple is linked to the "end" or last field of another tuple). According to an embodiment, tuples are linked in the head-end manner when the contents of the tail of one tuple is identical to or highly correlated with the head of another tuple. For example, one tuple: $S_i$; $V_i$; $O_i$, may be joined to another tuple: $S_k$; $V_k$; $O_k$, by linking $O_i$ and $S_k$, when $O_i$ and $S_k$ are the same (e.g., they identify the same person) or they are highly correlated (e.g., they include aliases of the same individual, or they identify a person and a group with which the person is associated). As a more specific example, if Tuple 2 is defined as {sender=T. A.; time=2:17 p.m.; date=Aug. 12, 2009; recipient=O. W.}, and Tuple 3 is defined as {sender=O. W.; time=3:14 p.m.; date=Aug. 12, 2009; recipient=A. V.}, a chain may be created by linking the end of Tuple 2 (e.g., the recipient field that includes O. W.) with the head of Tuple 3 (i.e., the sender field that includes O. W.). Additional tuples may be linked to either end of the chain, as well. In alternate embodiments, the system may link tuples together in a manner that is different from the "head-end" manner described above.

Figure 4:
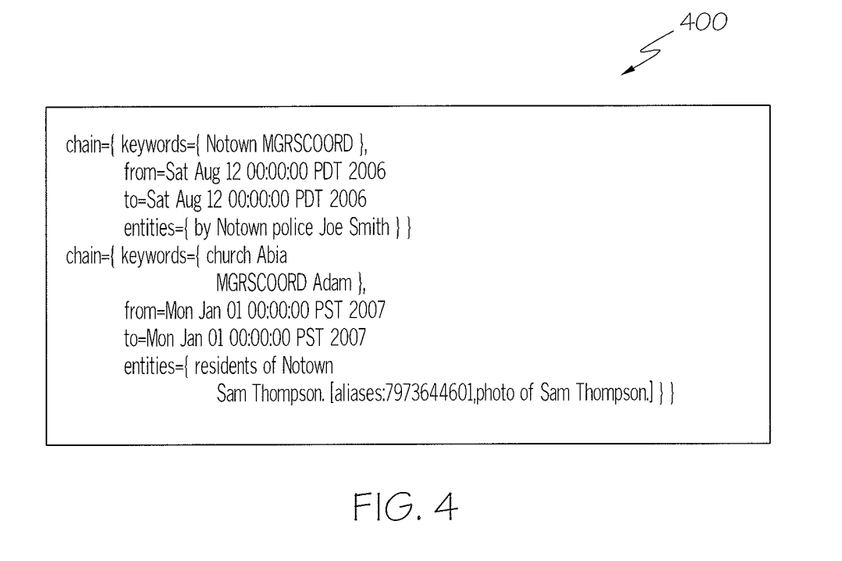
FIG. 4 illustrates exemplary chain-defining configuration information, in accordance with an example embodiment.
Figure 6:
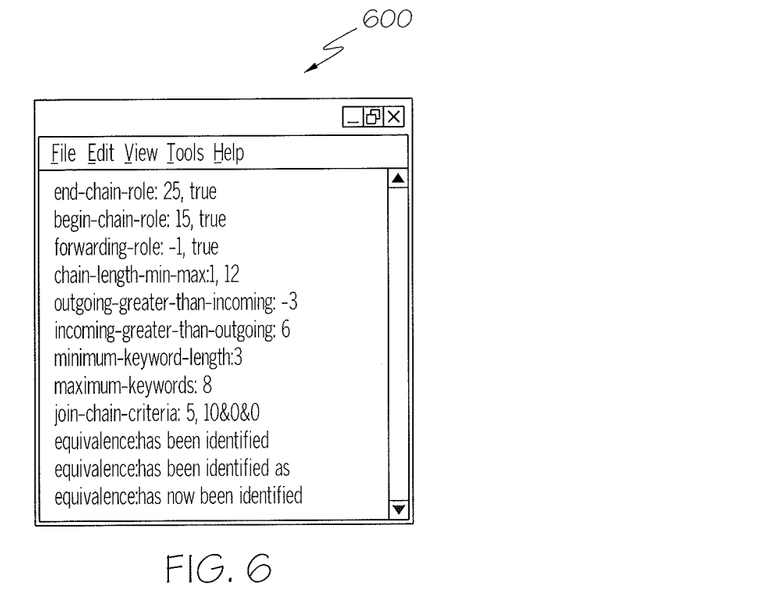
FIG. 6 is an exemplary listing of a first configuration file, in accordance with an example embodiment.
Figure 7:
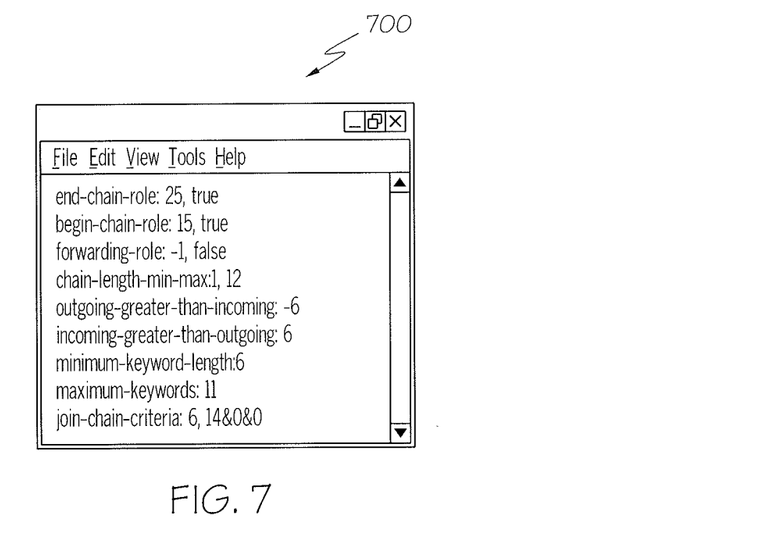
FIG. 7 is an exemplary listing of a second configuration file, in accordance with an example embodiment.

The manner in which the tuples are linked together as chains may be defined by "chain-defining" configuration information specified by a user, in an embodiment. For example, FIG. 4 illustrates a code sample 400 of chain-defining configuration information that could be used to specify which tuples may be linked into a chain, based on the content of the tuples, and FIGS. 6 and 7 illustrate configuration files that include chain-defining configuration information that places temporal and structural constraints on the formation of each chain. For example, the number and characteristics of tuples that may be joined into a chain may be specified by a "chain-length-min-max" configuration parameter and/or a "join-chain-criteria" configuration parameter. As indicated in FIGS. 6 and 7, the "chain-length-min-max" configuration parameter may be used to quantify the minimal and maximal lengths of a chain (e.g., min length=1 tuple and max length=12 tuples in both FIGS. 6 and 7). The "join-chain-criteria" configuration parameter may be used to specify temporal restrictions on joining tuples into a chain. For example, as shown in FIGS. 6 and 7, a "join-chain-criteria" configuration parameter may be formatted as follows: join-chain-criteria: N,DD&HH&MM, where N indicates a number of tuples, and DD&HH&MM indicates a number of days, hours, and minutes. In the example of FIG. 6, the user has specified that 5 (N) tuples are allowed to be joined into a chain within a 10 day (DD), 0 hours (HH), and 0 minutes (MM) period. Accordingly, tuples corresponding to events or actions (e.g., tuples for emails that were sent) that occur within the 10 day period may be joined or linked into a chain. In the example of FIG. 7, the user has specified that 6 (N) tuples are allowed to be joined into a chain, which correspond to events that occurred within a 14 day (DD), 0 hour (HH), and 0 minute (MM) period. Accordingly, tuples associated with events or actions that occurred within the 14 day period may be joined or linked. This configuration information may enable the quantity of total tuples that may be considered for inclusion in a chain to be reduced.

In addition to chain size and temporal restrictions that may be specified, the contents of the tuples may also be considered in determining which tuples to link into a chain. For example, in FIG. 4, the first chain definition may be used to specify which tuples should be linked together to form a first type of chain. For example, the first chain definition may result in sets of tuples being linked together that have date/time fields that are populated with a value between "Sat Aug 12 00:00:00 PDT 2006" and "Sun Aug 13 00:00:00 PDT 2006", and which also include any one or more of the keywords "Notown" and/or "MGRSCOORD," and/or the entities "Notown police" and/or "Joe Smith." Similarly, the second chain definition may result in tuples being linked together that have date/time fields that are populated with a value between "Mon Jan 1 00:00:00 PDT 2007" and "Weds Jan 3 00:00:00 PDT 2007", and which also include any one or more of the keywords "church," "Abia," "MGRSCOORD," and/or "Adam," and/or the entities "residents of Notown," "Sam Thompson," and/or Sam Thompson's alias "7973644601" or photograph.

Along with various keywords, date ranges, and entities, chain-defining configuration information also may include other parameters. For example, chain-defining configuration information may indicate upper and/or lower limits regarding the number of tuples that may be linked together to form any particular chain (see, e.g., "chain-length-min-max" field of the configuration information in FIGS. 6 and 7). Chain-defining configuration information may specify for example, that a chain may include only one tuple (in which case the process of creating chains does nothing more than assemble individual tuples that fit other criteria of the chain-defining configuration information). Alternatively, chain-defining configuration information may specify that a chain may include from one to a maximum number (e.g., 12 in FIGS. 6 and 7) linked tuples. This may result in the building of chains that include anywhere from one to the maximum number of tuples.

Figure 5:
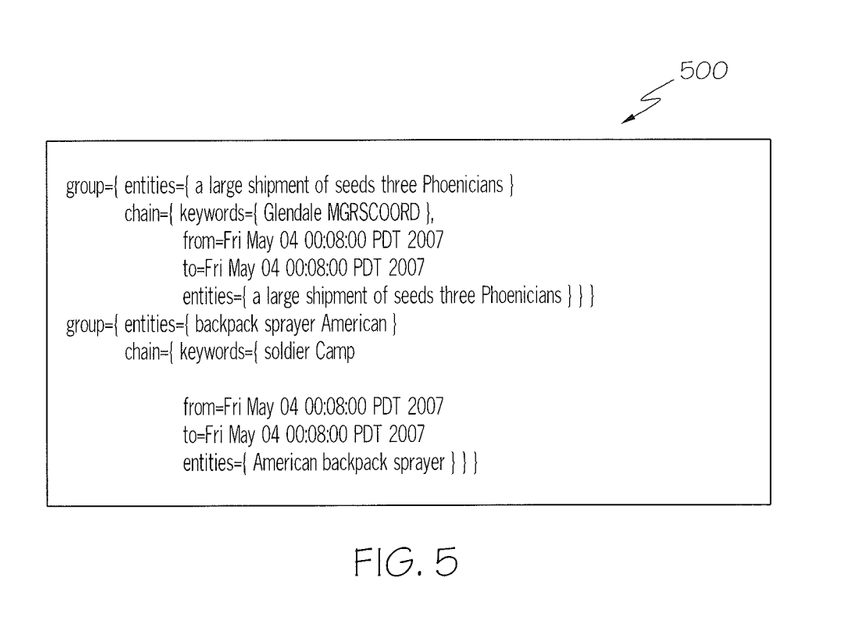
FIG. 5 illustrates exemplary group-defining configuration information, in accordance with an example embodiment.

According to an embodiment, link analyzer 120 also may generate or identify "groups" of chains, which may be defined based on various keywords and/or entities. As with tuples and chains, the manner in which chains are grouped together may be defined by "group-defining" configuration information specified by a user, in an embodiment. A "group" may represent a theme consisting of chains, keywords, and entities. For example, FIG. 5 illustrates a code sample 500 of group-defining configuration information that could be used to specify how two types of groups may be formed from a plurality of chains, in accordance with an example embodiment. More specifically, the first group definition may be used to select which chains would be grouped together to form a first group. For example, the first group definition may result in sets of chains being grouped together that have one or more date/time fields that are populated with a value between "Fri May 4 00:08:00 PDT 2007" and "Sun May 6 00:08:00 PDT 2007", and which also include any one or more of the keywords "Glendale" and/or "MGRSCOORD," and/or the entities "a large shipment of seeds," and/or "three Phoenicians." As with chain-defining configuration information, group-defining configuration information also may include other parameters (e.g., upper and/or lower limits regarding the number of chains that may be grouped together to form any particular group).

In various embodiments, the system also may associate chains and groups together in higher and higher levels of association (e.g., groups may be associated as part of a "story" (e.g., a set of groups), and stories may be associated as part of a "theme" (e.g., a set of stories)), where each level of association may be defined by configuration information. Information defining the groups, stories, and/or themes may be stored in data storage 125, in an embodiment.

Regardless of how they are ultimately associated, according to an embodiment, one or more groups of chains may be used by the system 100 (e.g., link analyzer 120) to calculate significance indicators and total significance scores among various entities, as will be discussed in more detail below. The relative significance of HVIs or other types of entities may be identified by evaluating and ranking these total significance scores, as will also be explained in more detail later.

Link analyzer 120 is configured to use various analytical correlation algorithms to process all searched results and identified entities from the raw data sources (e.g., database 130 and data sources 132-134), and to identify the relationships among entities (e.g., HVIs). When a particular set of entities occurs within one or more data blocks (e.g., ASCII or Unicode files, emails, and so on), link analyzer 120 associates the entities, in process 214, by establishing connection weights between the entity sets. Information defining the associated entities and their connection weights may be stored in data storage 125, for example. According to an embodiment, a connection weight between a set of entities may be adjusted (i.e., increased and/or decreased) dynamically over time. For example, assume that the terms "T. A." and "Z. O." (each of which pertain to an individual) have been specified as keywords or entities, and a plurality of analyzed emails include the terms "T. A." and "Z. O.". More particularly, for example, each of the plurality of emails each may identify "T. A." as a sender of the email and "Z. O." as a recipient or correspondence contact of the email, or vice versa. According to an embodiment, because "T. A." and "Z. O." both occur in at least one email, link analyzer 120 may associate "T. A." and "Z. O." by establishing an initial connection weight between "T. A." and "Z. O.". As more emails (and/or other correspondence or data blocks) are analyzed, the association between "T. A." and "Z. O." may be dynamically quantified by adjusting (e.g., increasing) the connection weight. The initially determined connection weight and the adjustments thereto may be calculated based on the number of shared or common keywords and the keywords' statistics in the analyzed emails. For example, link analyzer 120 may intermittently or continuously adjust the connection weights as additional data blocks are analyzed.

According to an embodiment, the connection weights also may be adjusted based on temporal factors. For example, if "T. A." and "Z. O." exchange emails frequently and/or multiple times within a relatively short time period, the connection weight may be relatively high and/or occasionally increased to reflect the high level of communications. Conversely, if "T. A." and "Z. O." exchange emails infrequently and/or have not exchanged emails for a relatively long time period (e.g., months or years), the connection weight may be relatively low and/or occasionally decreased to reflect the low level of communications. Table 1, below, is an exemplary entity association table, according to an embodiment:

TABLE 1

Entity Association Table example

| Record Number | Associated Entities | Connection Weight |
|---|---|---|
| 1 | T. A.; Z. O. | 145 |
| 2 | T. A.; O. W. | 27 |
| ... | | |
| 45 | S. W.; K. J. | 7 |

In the above table, the "Record Number" field may include information that enables a particular entity set (e.g., a set of individuals or other keywords/entities) to be uniquely identified by the system 100. The "Associated Entities" field may include the set of entities (e.g., the names of individuals) that the record pertains to. The "Connection Weight" field may include the system-determined connection weight for the set of entities, which may be dynamically adjusted, as described above. For example, in Table 1, above, record number 1 indicates that T. A. and Z. O. have been associated by the system, and the current connection weight between the individuals is 145. Conversely, record number 2 indicates that T. A. and O. W. have been associated, and the current connection weight between the individuals is 27. This indicates that T. A. and Z. O. have a relatively strong association (e.g., more frequent communications within a short time period), and that T. A. and O. W. have a relatively weak association (e.g., less frequent communications within a long time period).

According to an embodiment, connection weights among entities identified in large volumes of data are built against a criteria for identifying and tracking HVIs (e.g. $\sigma_\chi(\epsilon, \delta)$, described below). In addition, in conjunction with graphically presenting information regarding a particular search and analysis to a user (e.g., via the display of user terminal 150), connection weights among entities may be used to determine where to place entities in a graphical representation of the analysis results (e.g., associated entities with high connection weights may be placed closer together), and/or how otherwise to indicate relatively strong or weak connection weights between entities. Although the above example describes associations and connection weights between individuals, associations and/or connection weights may be established between other types of keywords and/or entities, as well.

In addition to associating entities, link analyzer 120 may track behaviors and patterns of individuals (e.g., HVIs), in an embodiment. For example, link analyzer 120 may analyze parsed data and determine that a particular individual performs some action (e.g., attend church, meet with a group, work, call a certain telephone number, go to a location, send an email, and so on) in a predictable manner (e.g., at a certain time of day/week/year, and/or in response to a particular event). Information characterizing the behaviors and patterns of individuals also may be presented to a user (e.g., via user terminal 150). Parsed data, keyword statistics, entity association information (including association weights), and information characterizing behaviors and patterns may be stored in data storage 125 or elsewhere.

Figure 8:
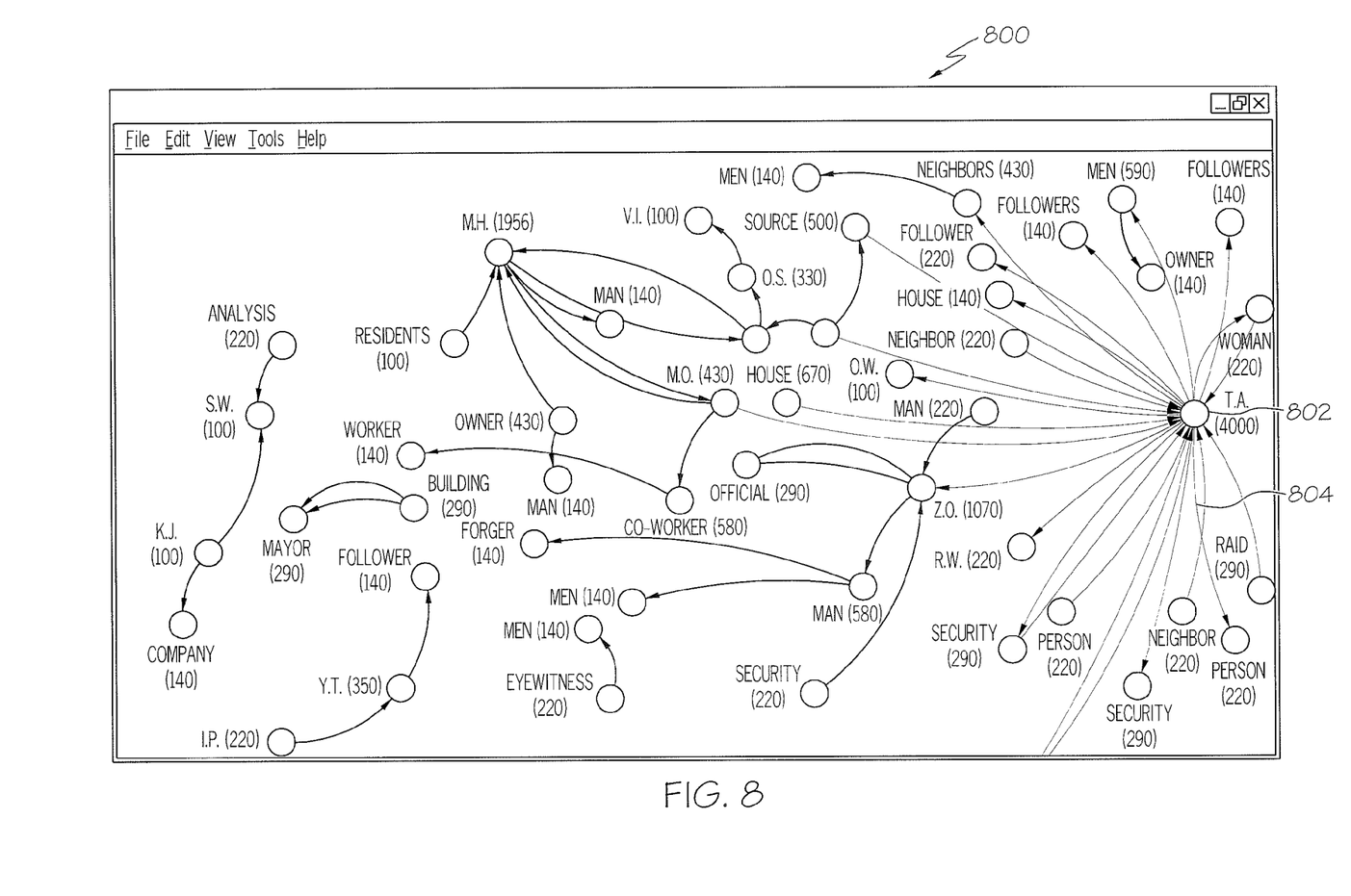
FIG. 8 illustrates an exemplary screen shot of a depiction of a plurality of entities, significance scores, and associations, in accordance with an example embodiment.
Figure 9:
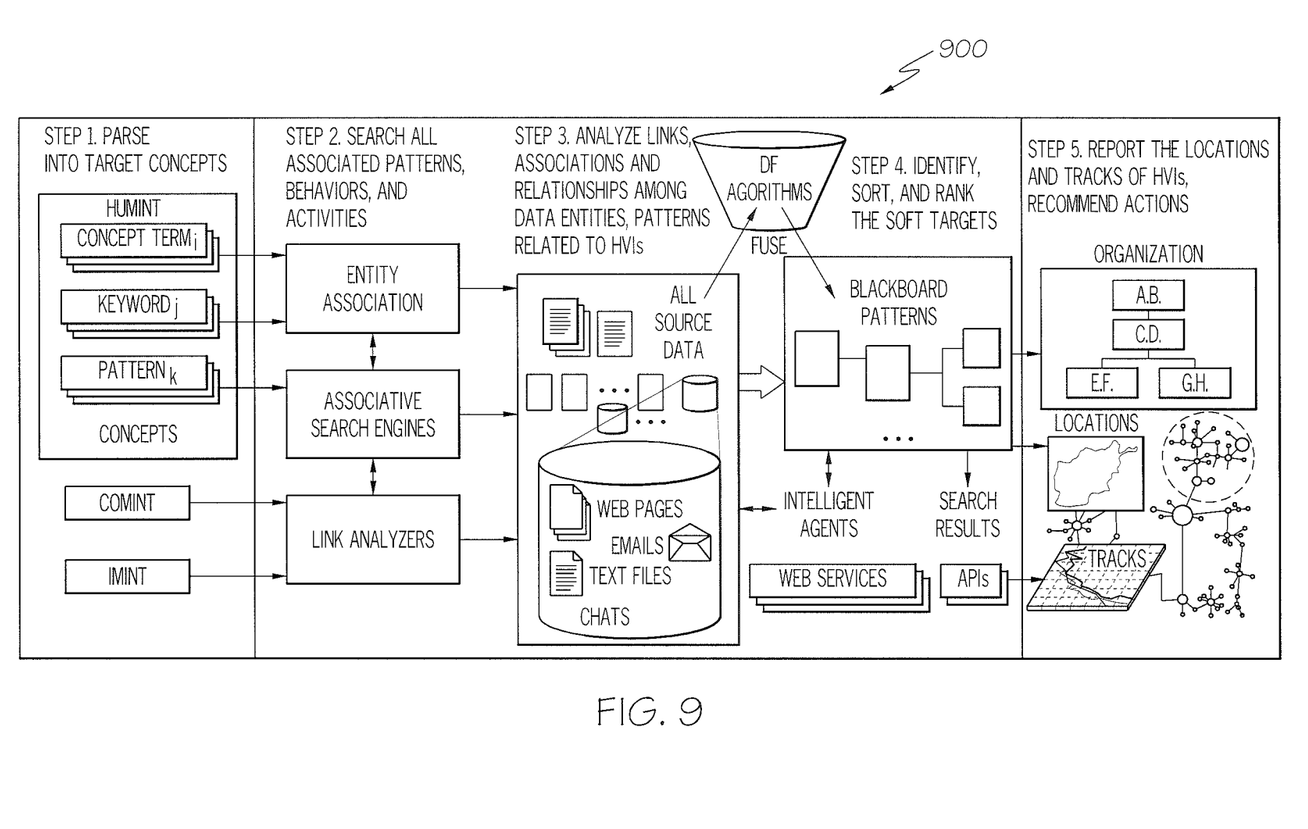
FIG. 9 illustrates an exemplary conceptual diagram of an embodiment of an information analysis system, processes performed by the system, and information that may be presented by the system, in accordance with an embodiment.

According to an embodiment, link analyzer 120 uses adjustable weights and heuristic rules to quantify the importance of entities using groups of chains (e.g., groups of chains identified by associative search engine 110). In an embodiment, link analyzer 120 may occasionally, frequently or continuously identify, analyze, and/or track entities, concepts, and patterns of an entity's activity and behavior data. This is achieved, in an embodiment, by matching text terms at the byte level and by linking entities via connection weights, as described above. Link analyzer 120 also may provide information designed to assist analysts or users in more clearly understanding the significance of identified entities and the arrangement or organization of groups, organizations, and/or social networks to which they belong (e.g., as illustrated in FIGS. 8, 9).

In process 216, and according to an embodiment, link analyzer 120 calculates a plurality of significance indicators, $SC_i$, for each entity, $\epsilon$ (e.g., an individual or other entity), and generates a total significance score, $\sigma_\chi(\epsilon, \delta)$, from the plurality of significance indicators. The significance indicators (and thus the total significance score) are determined based on analyses of a plurality of chains. More particularly, the significance indicators are determined based, at least in part, on the positions of the entity within the chains (e.g., whether and how many times the entity is identified in the beginning, middle, or end of the chains).

Essentially, the significance indicators quantify various criteria that may be useful in identifying an entity that may be of particular importance or significance (i.e., an HVI). In calculating a total significance score for an entity, each significance indicator is weighted, in an embodiment, with the result that more heavily-weighted significance indicators have more significant roles in the calculation of the total significance score. The particular weights associated with the various significance indicators may be established by a user (e.g., via user terminal 150). For example, a user may supply "score-calculation" configuration information, which may specify the weights applied to each of the significance indicators. Through adjustments of the weights, the impact of a particular significance indicator on a total significance score may be adjusted or configured without necessarily recompiling the link analyzer 120. In an embodiment, the weights to be applied to the various significance indicators may be specified in score-calculation configuration information in a configuration file (e.g., one of configuration files 600, 700, FIGS. 6, 7).

Each of the significance indicators may pertain to a role of an individual within a plurality of chains of correspondence (e.g., indicating how often the individual is at the beginning, middle or end of the chains of correspondence, and/or how many correspondences the individual sends and/or receives). According to an embodiment, the "significance indicators" used in the calculation of a total "significance score" for a particular entity include one or more significance indicators selected from a group comprised of:

1) an "end-chain-role" significance indicator, $$SC_1 = \sum_{i=1}^{N} \phi_i \varpi_1(e, d),$$

which indicates the sum of occurrence frequencies $\phi_i$ within N chains (which were derived from data $\delta$) that the entity was at the end of the chain. $SC_1$ is weighted by a weight $\omega_1$ (e.g., 25 in FIGS. 6, 7). Essentially, $SC_1$ quantifies the significance (or role) for chain-end entities of an entity or concept set or in a group, theme or hypothesis. In other words, $SC_1$ for an individual indicates the number of times the individual was included at the end of one of the N chains, or the percentage of the N chains that had the individual included at the end. For example, referring to FIG. 8, the graphical depiction of the analysis results indicate that entity T. A. 802 was the end of a chain eleven (11) times (as indicated by 11 entity-to-entity connections terminating at T. A.). If, for example, the weight, $\omega_1$, of the end-chain-role significance indicator is 25, the end-chain-role significance indicator for T. A. would equal 11×25;

2) a "begin-chain-role" significance indicator, $$SC_2 = \sum_{j=1}^{P} \phi_j \varpi_1(e, d),$$

which indicates the sum of occurrence frequencies $\phi_j$ within P chains (which were derived from data $\delta$) that the entity was at the beginning of the chain $SC_2$ is weighted by a weight $\omega_2$ (e.g., 15 in FIGS. 6, 7). Essentially, $SC_2$ quantifies the significance (or role) for the begin-chain entities of the entity-concept set in the same group, theme, or hypothesis. In other words, $SC_2$ for an individual indicates the number of times the individual was included at the beginning of one of the P chains, or the percentage of the P chains that had the individual included at the beginning.

3) a "forwarding-role" significance indicator, $$SC_3 = \sum_{k=1}^{Q} \mu_k \varpi_3(e, d),$$

which indicates the sum of the number of messages $\mu_k$ forwarded by an entity in Q chains (which were derived from data $\delta$). $SC_3$ is weighted by a weight $\omega_3$ (e.g. −1 in FIGS. 6, 7). A negative number for $\omega_3$ results in the significance of each message-forwarding activity being decreased, and a positive number for $\omega_3$ results in the significance of each message-forwarding activity being increased. Forwarding may be detected, for example, based on an entities intermediate position in the links of a chain;

4) an "outgoing-greater-than-incoming" significance indicator, $$SC_4 = \sum_{m=1}^{R} o_m \varpi_4(e, d)$$

is a sum that indicates when an entity has more outbound communications than inbound ones as determined from R chains (which were derived from data $\delta$), $SC_4$ is weighted by a weight $\omega_4$. A negative number for $\omega_4$ (e.g. −3 in FIG. 6 and −6 in FIG. 7) results in reducing the significance of the entity, whereas a positive number for $\omega_4$ results in increasing the significance of the entity; and 5) an "incoming-greater-than-outgoing" significance indicator, $SC_5 = \Sigma l_t \omega_5$ is a sum that indicates when an entity has more inbound communications than outbound ones as determined from S chains (which were derived from data $\delta$). $SC_5$ is weighted by a weight $\omega_5$. A positive number for $\omega_5$ (e.g., 6 in FIGS. 6 and 7) results in increasing the significance of the entity, whereas a negative number for $\omega_5$ results in decreasing the significance of the entity.

In an embodiment, all of the above listed significance indicators are used in the calculation of a total significance score for a given entity. In other embodiments, more, fewer and/or different significance indicators may be used in the calculation of a total significance score for a given entity. According to an embodiment, a total significance score for an entity may be represented according to the following equation:

$$\sigma_\chi(\varepsilon, \delta) = \sum_{i=1}^{N} \phi_i \varpi_1(e, d) + \sum_{j=1}^{P} \phi_j \varpi_2(e, d) + \sum_{k=1}^{Q} \mu_k \varpi_3(e, d) + \sum_{m=1}^{R} o_m \varpi_4(e, d) + \sum_{t=1}^{S} l_t \varpi_5(e, d),$$

where $\varepsilon$ identifies the entity for which the significance score is being calculated, and $\delta$ identifies the data source (or sources) that are the subject of the analysis. In an embodiment, a single significance score may be calculated for all data sources combined. Alternatively, for an individual, multiple significance scores may be calculated (e.g., one significance score for each of a plurality of different data sources), and the multiple significance scores may be combined to generate a total significance score. For example, a first data source, $\delta_1$, may include transcriptions of telephone conversations, a second data source, $\delta_2$, may include emails, and a third data source, $\delta_3$, may include text messages. In one embodiment, all of the communications may be grouped together and a single significance score may be calculated. In an alternate embodiment, three separate significance scores may be calculated (i.e., one each for the telephone, email, and text data sources), and the significance scores may be combined to generate a total significance score. In the latter embodiment, the same or different weights (i.e., weights $\omega_1$, $\omega_2$, $\omega_3$, $\omega_4$, $\omega_5$) may be used for each of the calculated significance indicators. In addition, weighting may be applied to each of the significance scores, which enables more emphasis to be placed on one type of data source than another.

The significance indicators and/or significance scores for each entity may be maintained in an entity significance table, for example. After establishment of initial significance indicators and/or scores based on initially analyzed data blocks, the significance indicators and/or scores may thereafter be updated as new data blocks are analyzed and linked, in an embodiment. Table 2, below is an example of an entity significance table, which indicates significance indicators and total significance scores for a number of entities, according to an embodiment:

TABLE 2

Entity Significance Table example

| Record Number | Entity Name | SC1 | SC2 | SC3 | SC4 | SC5 | Total significance score |
|---|---|---|---|---|---|---|---|
| 1 | T. A. | 952 | 665 | 120 | 816 | 1447 | 4000 |
| 2 | Z. O. | 84 | 215 | 198 | 277 | 296 | 1070 |
| ... | | | | | | | |
| 56 | K. J. | 18 | 22 | 19 | 27 | 14 | 100 |

Referring again to FIG. 2, the various entities and their significance scores may be presented to the user, in process 218. This presentation of results may be made in response to user inputs requesting such a presentation. According to an embodiment, the entities and their significance scores may be presented using a graphical user interface (e.g., via user terminal 150), which graphically depicts entities, their significance scores, associations between entities, and association weights. For example, this information may be presented in a format similar to that illustrated in FIG. 8 or 9, described below, although the information alternatively may be displayed in other formats (e.g., in the form of reports or lists for example). Although FIG. 2 depicts the method as ending after presentation of the results to the user, it is to be understood that various processes previously described may be continuously performed in order to present updated information to the user based on newly received and analyzed data. In addition, although the processes of FIG. 2 are shown in a linear sequence, it is to be understood that some or all of the processes may be performed in different orders from that shown and/or in parallel with each other.

FIG. 8 illustrates an example screen shot 800 of a depiction of a plurality of entities, significance scores, and connections (e.g., links or lines between entities), according to an example embodiment. Such a depiction may be displayed, for example, on the display screen of a user terminal 150 to assist the user in understanding the results produced by the search system 100. Entities are indicated by circles and identifying text (e.g., circle 802 and text "T. A."), and significance scores are indicated in parenthesis (e.g., 4000 for entity T. A.). Associations or connections between entities are represented by connecting lines 804. In an embodiment, the connection weight between two entities may be represented by varying the appearance of the connecting lines 804 (e.g., entities having a relatively high connection weight may have a thicker or darker connecting line 804, whereas entities having a relatively low connection weight may have a thinner or lighter connecting line 804). Alternatively, the connection weight may be represented by varying the distance between the entities (e.g., entities having a relatively high connection weight may be closer together, whereas entities having a relatively low connection weight may be farther apart).

FIG. 9 illustrates a conceptual diagram 900 of an embodiment of an information analysis system, processes performed by the system, and information that may be presented by the system, according to an embodiment. For example, the system may include associative search engines and link analyzers, as discussed previously, which may receive structured and/or unstructured data in the form of human intelligence (HUMINT), communications intelligence (COMINT), image intelligence (IMINT), and other forms (e.g., web pages, emails, text files, chats). The data may be parsed into target concepts (step 1) and searched (step 2) to identify various entities. Links, associations, and relationships may be determined among the entities (step 3), and HVIs and soft targets may be identified, sorted, and ranked (step 4). Information regarding the entities (including HVIs) may then be reported (e.g., presented or displayed), and actions may be recommended (step 5). For example, information may be presented in the form of organization charts, maps, photographs, entity relationship charts (e.g., FIG. 8), and other information depictions.

Embodiments of integrated link analyzers (e.g., link analyzer 120, FIG. 1) and associative search engines (e.g., associative search engine 110, FIG. 1) have been shown to be effective in identifying HVIs, based on simulated scenarios and data. For example, in a particular experiment, simulated scenarios and data were used to identify HVIs from a plurality of fictional entities (individuals T. A., M. H., O. S., Z. O., and O. W.). The simulated data included information from ASCII files (*.xls, *.doc), such as telephone call scripts, interview notes, reports, and other data related to the plurality of individuals. Table 3, below, summarizes the results of two experiments executed using a search engine (e.g., associative search engine 110, FIG. 1) and link analyzer (e.g., link analyzer 120, FIG. 1), according to an embodiment. In the two experiments, parameters corresponding to the configuration files of FIGS. 6 and 7, respectively, were used. The experimental results summarized in Table 3 illustrate that the most significant HVI was detected as T. A., which determination was made based on his total significance scores (i.e., 298 in Experiment 1 and 311 in Experiment 2), using both of the configuration files:

TABLE 3

Experimental Results

| | Individuals (notional) | | | | |
| --- | --- | --- | --- | --- | --- |
| | T. A. | M. H. | O. S. | Z. O. | O. W. |
| $\sigma_x(\epsilon, \delta)$ in Experiment 1 | 298 | 156 | 102 | 90 | 105 |
| $\sigma_x(\epsilon, \delta)$ in Experiment 2 | 311 | 160 | 93 | 93 | 90 |

The experimental results indicate that embodiments of link analyzers (e.g., link analyzer 120, FIG. 1) and search engines (e.g., associative search engine 110, FIG. 1) are capable of exploiting and discovering HVIs from a plurality of individuals by sifting through data blocks and calculating significance scores. The various embodiments effectively identify HVIs by analyzing and investigating relationships and/or associations among entities identified in various types of data blocks, including both structured and unstructured data formatted in ASCII, Unicode, and/or other formats. Because the significance scores for various individuals likely will be different, the system thus enables a hierarchy of individuals within a group to be determined, where individuals with relatively high significance scores are located higher in the hierarchy (e.g., an individual with a highest significance score is located at the top of the hierarchy, indicating that the individual may be an HVI), and individuals with relatively low significance scores are located lower in the hierarchy (e.g., indicating that those individuals may not be HVIs). In this manner, the importance of various individuals within the context of a group may be determined.

Embodiments of methods and apparatus for analyzing data to identify entities of significance have now been described. These embodiments include integrated link analyzers (e.g., link analyzer 120, FIG. 1) and associative search engines (e.g., associative search engine 110, FIG. 1), which may effectively discover entities of significance (e.g., HVIs) from various structured and/or unstructured data within various types of data blocks. In various embodiments, link analyzers and search engines may ignore trivial words and/or clutter and sift through structured and/or unstructured data, in order to quickly search, link, analyze, and associate relationships of entities, and to effectively discover and track entities of significance (e.g., HVIs).

As described in detail above, an embodiments of a method for analyzing information performed by a data analysis system includes parsing data from one or more data sources, resulting in parsed data, forming a plurality of chains of terms from the parsed data, and determining a significance score for an entity identified in one or more of the chains based, at least in part, on one or more positions of the entity within the one or more chains.

In a further embodiment, the unstructured data is selected from a group consisting of human intelligence data, communications intelligence data, image intelligence data, reports, articles, text messages, web-based feeds, blogs, web pages, books, journals, documents, metadata, audio transcripts, video, files, body sections of an email-message or word processor document, conversation transcripts, and telephone call transcripts. In another further embodiment, the entity is a type of entity selected from a group consisting of an individual, an association, a business entity, a group, an organization, a location, a tangible or intangible subject, an object, an action, an event, a date, a date range, a time, a time range, a concept, and a keyword.

In another further embodiment, parsing the data includes parsing data blocks that include unstructured data. In another further embodiment, parsing the data includes searching the one or more data sources to identify and select, as the parsed data, data blocks that include one or more keywords. In another further embodiment, parsing the data includes searching the one or more data sources to identify and select, as the parsed data, data blocks associated with a group, an organization or a social network, where the entity is associated with the group, the organization or the social network. In another further embodiment, forming the plurality of chains includes forming a plurality of tuples, where each tuple includes multiple data fields organized in a known order, and each tuple has a head and an end, and forming at least a portion of a chain of the plurality of chains by connecting an end of a first tuple to an end of a second tuple when data stored in the end of the first tuple is identical to or highly correlated with data stored in the head of the second tuple. In another further embodiment, the method includes storing configuration information provided by a user, where the configuration information constrains a process performed by the data analysis system.

In another further embodiment, determining the significance score includes determining a plurality of significance indicators based on analyses of the one or more chains, where each significance indicator quantifies an importance of the entity, and calculating the significance score as a combination of the plurality of significance indicators. In another further embodiment, calculating the significance score includes applying a weighting factor to each of the significance indicators, resulting in a plurality of weighted significance indicators, and summing together the weighted significance indicators. In another further embodiment, the plurality of significance indicators are selected from a group of significance indicators consisting of an end-chain-role significance indicator, a begin-chain-role significance indicator, a forwarding-role significance indicator, an outgoing-greater-than-incoming significance indicator, and an incoming-greater-than-outgoing significance indicator. In another further embodiment, the significance score, $\sigma_\chi(\epsilon, \delta)$, is calculated using an equation:

$$\sigma_\chi(\varepsilon, \delta) = \sum_{i=1}^{N} \phi_i \varpi_1(e_i, d) + \sum_{j=1}^{P} \phi_j \varpi_2(e, d) + \sum_{k=1}^{Q} \mu_k \varpi_3(e, d) + \sum_{m=1}^{R} o_m \varpi_4(e, d) + \sum_{t=1}^{S} l_t \varpi_5(e, d),$$

where $\Sigma\phi_i\omega_1$ is the end-chain-role significance indicator, $\Sigma\phi_j\omega_2$ is the begin-chain-role significance indicator, $\Sigma\mu_k\omega_3$ is the forwarding-role significance indicator, $\Sigma O_m\omega_4$ is the outgoing-greater-than-incoming significance indicator, $\Sigma\iota_t\omega_5$ is the incoming-greater-than-outgoing significance indicator, and $\omega_1$, $\omega_2$, $\omega_3$, $\omega_4$, and $\omega_5$ are weighting factors applied to the significance indicators.

Another embodiment of a method for analyzing information performed by a data analysis system includes parsing unstructured data from one or more data sources, resulting in parsed data, organizing entities identified in the parsed data into sets of entities, analyzing the sets of entities to determine roles of an individual within a plurality of chains of correspondence, and determining a significance score for the individual based on determining the roles.

In a further embodiment, determining the significance score includes determining a plurality of significance indicators based on analyses of the sets of entities, where each significance indicator quantifies an importance of the individual, and calculating the significance score as a combination of the plurality of significance indicators. In another further embodiment, calculating the significance score includes applying a weighting factor to each of the significance indicators, resulting in a plurality of weighted significance indicators, and summing together the weighted significance indicators. In another further embodiment, the method also includes providing a graphical depiction of an identity of the individual and the significance score for the individual.

In another further embodiment, the plurality of significance indicators are selected from a group of significance indicators consisting of an end-chain-role significance indicator, a begin-chain-role significance indicator, a forwarding-role significance indicator, an outgoing-greater-than-incoming significance indicator, and an incoming-greater-than-outgoing significance indicator.

Another embodiment of a data analysis system includes one or more search engines configured to parse data from one or more data sources, resulting in parsed data, and one or more link analyzers operably coupled with the one or more search engines, and configured to form a plurality of chains of terms from the parsed data, and to determine a significance score for an entity identified in one or more of the chains based, at least in part, on one or more positions of the entity within the one or more chains.

In a further embodiment, the one or more data sources are configured to provide access to the data, where the data includes unstructured data. In another further embodiment, the system includes a user terminal configured to provide a graphical depiction of an identity of the entity and the significance score.

Techniques and technologies have been described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals.

Indeed, when implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like. The computer data signal may include any signal that can propagate over a transmission medium such as electronic network channels, optical fibers, air, electromagnetic paths, or RF links. The code segments may be downloaded via computer networks such as the Internet, an intranet, a local area network (LAN), or the like. While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for analyzing information performed by a data analysis system, the method comprising:
   parsing from one or more data sources data blocks that include unstructured data, resulting in parsed data, wherein the unstructured data is selected from a group consisting of human intelligence data, communications intelligence data, image intelligence data, reports, articles, text messages, web-based feeds, blogs, web pages, books, journals, documents, metadata, audio transcripts, video, files, body sections of an email-message or word processor document, conversation transcripts, and telephone call transcripts;

forming a plurality of chains of terms from the parsed data; and determining a significance score for an entity identified in one or more of the chains based, at least in part, on one or more positions of the entity within the one or more chains.

2. The method of claim 1, wherein parsing the data comprises:
searching the one or more data sources to identify and select, as the parsed data, data blocks that include one or more keywords.

3. The method of claim 1, wherein parsing the data comprises:
searching the one or more data sources to identify and select, as the parsed data, data blocks associated with a group, an organization or a social network, wherein the entity is associated with the group, the organization or the social network.

4. The method of claim 1, wherein forming the plurality of chains comprises:
forming a plurality of tuples, wherein each tuple includes multiple data fields organized in a known order, and each tuple has a head and an end; and
forming at least a portion of a chain of the plurality of chains by connecting an end of a first tuple to an end of a second tuple when data stored in the end of the first tuple is identical to or highly correlated with data stored in the head of the second tuple.

5. The method of claim 4, further comprising:
storing configuration information provided by a user, wherein the configuration information constrains a process performed by the data analysis system.

6. A method for analyzing information performed by a data analysis system, the method comprising:
parsing data from one or more data sources, resulting in parsed data,
forming a plurality of chains of terms from the parsed data and
determining a significance score for an entity identified in one or more of the chains based, at least in part, on one or more positions of the entity within the one or more chains, wherein the entity is a type of entity selected from a group consisting of an individual, an association, a business entity, a group, an organization, a location, a tangible or intangible subject, an object, an action, an event, a date, a date range, a time, a time range, a concept, and a keyword.

7. The method of claim 1, wherein determining the significance score comprises:
determining a plurality of significance indicators based on analyses of the one or more chains, wherein each significance indicator quantifies an importance of the entity; and
calculating the significance score as a combination of the plurality of significance indicators.

8. The method of claim 7, wherein calculating the significance score comprises:

applying a weighting factor to each of the significance indicators, resulting in a plurality of weighted significance indicators; and
summing together the weighted significance indicators.

9. The method of claim 7, wherein the plurality of significance indicators are selected from a group of significance indicators consisting of an end-chain-role significance indicator, a begin-chain-role significance indicator, a forwarding-role significance indicator, an outgoing-greater-than-incoming significance indicator, and an incoming-greater-than-outgoing significance indicator.

10. The method of claim 9, wherein the significance score, $\sigma_\chi(\epsilon, \delta)$, is calculated using an equation:

$$\sigma_\chi(\varepsilon, \delta) = \sum_{i=1}^{N} \phi_i \varpi_1(e_i, d) + \sum_{j=1}^{P} \phi_j \varpi_2(e, d) + \sum_{k=1}^{Q} \mu_k \varpi_3(e, d) + \sum_{m=1}^{R} o_m \varpi_4(e, d) + \sum_{t=1}^{S} l_t \varpi_5(e, d),$$

where $\Sigma\phi_i\omega_1$ is the end-chain-role significance indicator, $\Sigma\phi_j\omega_2$ is the begin-chain-role significance indicator, $\Sigma\mu_k\omega_3$ is the forwarding-role significance indicator, $\Sigma O_m\omega_4$ is the outgoing-greater-than-incoming significance indicator, $\Sigma\tau_t\omega_5$ is the incoming-greater-than-outgoing significance indicator, and $\omega_1$, $\omega_2$, $\omega_3$, $\omega_4$, and $\omega_5$ are weighting factors applied to the significance indicators.

11. A method for analyzing information performed by a data analysis system, the method comprising:
parsing unstructured data from one or more data sources, resulting in parsed data;
organizing entities identified in the parsed data into sets of entities;
analyzing the sets of entities to determine roles of an individual within a plurality of chains of correspondence;
determining a plurality of significance indicators based on analyses of the sets of entities, wherein each significance indicator quantifies an importance of the individual, and wherein the plurality of significance indicators are selected from a group of significance indicators consisting of an end-chain-role significance indicator, a begin-chain-role significance indicator, a forwarding-role significance indicator, an outgoing-greater-than-incoming significance indicator, and an incoming-greater-than-outgoing significance indicator; and
calculating the significance score as a combination of the plurality of significance indicators.

12. The method of claim 11, wherein calculating the significance score comprises:
applying a weighting factor to each of the significance indicators, resulting in a plurality of weighted significance indicators; and
summing together the weighted significance indicators.

13. The method of claim 11, further comprising:
providing a graphical depiction of an identity of the individual and the significance score for the individual.

14. A data analysis system comprising:
a computer-readable medium comprising:
one or more search engines configured to parse from one or more data sources data blocks that include unstructured data, resulting in parsed data, wherein the unstructured data is selected from a group consisting of human intelligence data, communications intelligence data, image intelligence data, reports, articles, text messages, web-based feeds, blogs, web pages, books, journals, documents, metadata, audio transcripts, video, files, body sections of an email-message or word processor document, conversation transcripts, and telephone call transcripts; and one or more link analyzers operably coupled with the one or more search engines, and configured to form a plurality of chains of terms from the parsed data, and to determine a significance score for an entity identified in one or more of the chains based, at least in part, on one or more positions of the entity within the one or more chains.

15. The data analysis system of claim 14, further comprising:

the one or more data sources configured to provide access to the data.

16. The data analysis system of claim 14, further comprising:

a user terminal configured to provide a graphical depiction of an identity of the entity and the significance score.

* * * * *